United States Patent [19]
Moberly

[11] 3,884,883
[45] May 20, 1975

[54] ARYLENE SULFIDE POLYMERS
[75] Inventor: Charles W. Moberly, Bartlesville, Okla.
[73] Assignee: Phillips Petroleum Company, Bartlesville, Okla.
[22] Filed: Nov. 19, 1973
[21] Appl. No.: 416,823

[52] U.S. Cl. ................................. 260/79.1; 260/79
[51] Int. Cl. ............................................. C08g 23/00
[58] Field of Search ............................. 260/79, 79.1

[56] References Cited
UNITED STATES PATENTS
3,356,656  12/1967  Remes et al. ........................ 260/79
3,367,975  2/1968  Liggett ................................. 260/79

Primary Examiner—Melvyn I. Marquis

[57] ABSTRACT

A method of producing arylene sulfide polymers employing (1) polyhalosubstituted aromatic compounds; (2) thiocarbonates; (3) bases selected from the hydroxides of lithium, sodium, potassium, rubidium, cesium, magnesium, calcium, strontium and barium and the carbonates of sodium, potassium, rubidium and cesium; and, (4) organic amides.

14 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which at least one thiocarbonate, as hereinafter defined, at least one base selected from the hydroxides of lithium, sodium, potassium, rubidium, cesium, magnesium, calcium, strontium and barium, and the carbonates of sodium, potassium, rubidium and cesium and at least one organic amide are contacted.

The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Patent 3,354,129. Mixtures of polyhalo-substituted aromatic compounds such as dihalobenzenes can be used, for example, a mixture comprising at least one m-dihalobenzene and at least one p-dihalobenzene.

Thiocarbonates which are preferred for use in the process of this invention can be represented by the formula

$$RXCXR,$$

wherein each R is an alkali metal or a monovalent hydrocarbyl radical selected from alkyl, cycloalkyl, and aryl, and combinations thereof such as alkaryl, aralkyl, and the like, the number of carbon atoms in said hydrocarbyl radical being within the range of one to about 12, at least one R being said monovalent hydrocarbyl radical, and X is selected from oxygen and sulfur, at least one X being oxygen and at least one X being sulfur.

Examples of some thiocarbonates which can be used include lithium methylxanthate, potassium ethylxanthate, methyl isopropylxanthate, ethyl butylxanthate, isobutyl hexylxanthate, cyclohexylmethyl (2-ethylhexyl)xanthate, dodecyl dodecylxanthate, cesium dodecylxanthate, cesium cyclohexylxanthate, heptyl (3-methylcyclopentyl)xanthate, sodium phenylxanthate, benzyl p-tolylxanthate, S,S-diethyl dithiocarbonate, S-methyl S-butyl dithiocarbonate, S-cyclopentyl S-phenyl dithiocarbonate, O,O-dipropyl thiocarbonate, O-ethyl O-isobutyl thiocarbonate, O-(2-methylcyclopentyl) O-benzyl thiocarbonate, O-phenyl S-cyclohexyl thiocarbonate, S-rubidium O-ethyl thiocarbonate, and the like, and mixtures thereof.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate, and mixtures thereof. If desired, the hydroxide can be produced in situ by the reaction of the corresponding oxide with water.

The organic amides used in the method of this invention should be substantially liquid at the reaction temperatures and pressures employed.

The amides can be cyclic or acyclic and can have one to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, $\epsilon$-caprolactam, N-methyl-$\epsilon$-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the thiocarbonate, the base and the organic amide or which can be present in a composite formed from the thiocarbonate, the base and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the thiocarbonate, the base and the organic amide is maintained at polymerization conditions to produce the arylene sulfide polymer.

The ratio of reactants can vary considerably but about 0.9 to about 2, and preferably about 0.95 to about 1.2, gram-moles of the polyhalo-substituted aromatic compound will generally be employed per gram-atom of sulfur in the thiocarbonate. The base generally will be employed in an amount within the range of from about 1 to about 6, and preferably fron about 1.5 to about 4, gram-equivalents per gram-atom of sulfur in the thiocarbonate. As used herein, one gram-equivalent of the hydroxides of magnesium, calcium, strontium and barium represents the same amount as one-half gram-mole of these substances, whereas for the hydroxides of lithium, sodium, potassium, rubidium, and cesium, or for the carbonates of sodium, potassium, rubidium, and cesium, the amount represented by 1 gram-equivalent is considered to be the same as that represented by 1 gram-mole.

The amount of organic amide employed can also vary over a wide range but will generally be within the range of from about 100 grams to about 2,500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

The previous statements are based on the following example.

EXAMPLE

In the following example, the inherent viscosity was determined at 206° C. in 1-chloronaphthalene at a polymer concentration of 0.4 g/100 ml solution.

The reaction was carried out in a 1-liter stirred autoclave into which were charged 275 grams of N-methyl-2-pyrrolidone, 51.6 grams of 97% NaOH and 50.0 grams of potassium ethylxanthate.

The reactor was closed, flushed with nitrogen and adapted with distillation apparatus. Nitrogen was passed into the reactor at a rate of 0.05 SCFH, while being heated up to a temperature of 196° C. during which time a distillate was collected.

This distillate was comprised of about 24.9 weight percent water, 64.9 weight percent ethanol and 10.1 weight percent N-methyl-2-pyrrolidone.

After cooling the reactor to about 191° C., the distillation tube was removed and to the reactor contents was pressured a solution of 94.4 grams of 1,4-dichlorobenzene and 52 grams of N-methyl-2-pyrrolidone. This resulted in an overall molar ratio of 0.312 mole of potassium ethylxanthate, 1.25 moles of sodium hydroxide and 0.642 mole of 1,4-dichlorobenzene.

The reactor was heated to 246° C. and maintained at this temperature for 3 hours. The maximum pressure attained was 100 psig.

After cooling to about 66° C., the poly(p-phenylene sulfide) product was removed, washed once in methanol and three times in hot water. The vacuum dried product (58.2 grams) represented a yield of 87 percent, had an inherent viscosity of 0.09, an ash content of 0.58 weight percent, a crystalline melting point by differential thermal analysis of 284° C. on a sample quenched from 300° C., and a sulfur analysis of 28.4 weight percent.

The infrared spectrum showed the absorption characteristics of poly(p-phenylene sulfide) plus small absorptions at 12.8 and 14.5μ.

It is within the scope of the invention to bring the polyhalo-substituted aromatic compound, the thiocarbonate, the base and the organic amide into contact in any order.

Also, it is within the scope of this invention to remove water from any combination of the aforesaid compounds.

It will be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound wherein the halogen atoms are attached to aromatic ring carbon atoms, at least one base selected from the hydroxides of lithium, sodium, potassium, rubidium, cesium, magnesium, calcium, strontium and barium and the carbonates of sodium, potassium, rubidium and cesium, at least one organic amide and at least one thiocarbonate having the formula $$RXCXR,\overset{X}{\underset{\|}{}}$$

wherein each R is an alkali metal or a monovalent hydrocarbyl radical selected from alkyl, cycloalkyl and aryl and combinations of said radicals, the number of carbon atoms in said hydrocarbyl radical being within the range of one to about 12, at least one R being said monovalent hydrocarbyl radical, and X is oxygen or sulfur, at least one X being oxygen and at least one X being sulfur; and,
   b. maintaining at least a portion of said composition at polymerization conditions to produce said polymer.

2. The method of claim 1 in which said thiocarbonate is selected from the group consisting of lithium methylxanthate, potassium ethylxanthate, methyl isopropylxanthate, ethyl butylxanthate, isobutyl hexylxanthate, cyclohexylmethyl (2-ethylhexyl)xanthate, dodecyl dodecylxanthate, cesium cyclohexylxanthate, heptyl (3-methylcyclopentyl)xanthate, sodium phenylxanthate, benzyl p-tolylxanthate, S,S-diethyl dithiocarbonate, S-methyl S-butyl dithiocarbonate, S-cyclopentyl S-phenyl dithiocarbonate, O,O-dipropyl thiocarbonate, O-ethyl O-isobutyl thiocarbonate, O-(2-methylcyclopentyl) O-benzyl thiocarbonate, O-propyl S-decyl thiocarbonate, O-phenyl S-cyclohexyl thiocarbonate and S-rubidium O-ethyl thiocarbonate.

3. The method of claim 1 in which said polyhalo-substituted aromatic compound is employed in an amount within the range of from about 0.9 to about 2 gram-moles per gram-atom of sulfur in said thiocarbonate.

4. The method of claim 1 in which said base is employed in an amount within the range of from about 1 to about 6 gram-equivalents per gram-atom of sulfur in said thiocarbonate.

5. The method of claim 2 in which said organic amide is employed in an amount within the range of from about 100 grams to about 2,500 grams per gram-mole of polyhalo-substituted aromatic compound.

6. The method of claim 1 in which said polyhalo-substituted aromatic compound is p-dichlorobenzene, said organic amide is N-methyl-2-pyrrolidone, said base is sodium hydroxide and said thiocarbonate is potassium ethylxanthate.

7. The method of claim 1 in which water is removed from said composition prior to maintaining said composition at polymerization conditions.

8. A method of producing a polymer which comprises:
   a. contacting at least one thiocarbonate having the formula

wherein each R is an alkali metal or a monovalent hydrocarbyl radical selected from alkyl, cycloalkyl, and aryl radicals and combinations of said radicals, the number of carbon atoms in said hydrocarbyl radical being within the range of one to about 12, at least one R being said monovalent hydrocarbyl radical, and X is selected from oxyen and sulfur, at least one X being oxygen and at least one X being sulfur, at least one base selected from the hydroxides of lithium, sodium, potassium, rubidium, cesium, magnesium, calcium, strontium and barium and the carbonates of sodium, potassium, rubidium and cesium and at least one organic amide to form a first composition;
   b. contacting at least a portion of said first composition with at least one polyhalo-substituted aromatic compound wherein the halogen atoms are attached to aromatic ring carbon atoms to form a second composition; and,
   c. maintaining said second composition at polymerization conditions to form said polymer.

9. The method of claim 8 in which said thiocarbonate is selected from the group consisting of lithium methylxanthate, potassium ethylxanthate, methyl isopropylxanthate, ethyl butylxanthate, isobutyl hexylxanthate, cyclohexylmethyl (2-ethylhexyl)xanthate, dodecyl dodecylxanthate, cesium cyclohexylxanthate, heptyl (3-methylcyclopentyl)xanthate, sodium phenylxanthate, benzyl p-tolylxanthate, S,S-diethyl dithiocarbonate, S-methyl S-butyl dithiocarbonate, S-cyclopentyl S-phenyl dithiocarbonate, O,O-dipropyl thiocarbonate, O-ethyl O-isobutyl thiocarbonate, O-(2-methylcyclopentyl) O-benzyl thiocarbonate, O-propyl S-decyl thiocarbonate, O-phenyl S-cyclohexyl thiocarbonate and S-rubidium O-ethyl thiocarbonate.

10. The method of claim 8 in which said polyhalo-substituted aromatic compound is employed in an amount within the range of from about 0.9 to about 2 gram-moles per gram-atom of sulfur in said thiocarbonate.

11. The method of claim 8 in which said base is employed in an amount within the range of from about 1 to about 6 gram-equivalents per gram-atom of sulfur in said thiocarbonate.

12. The method of claim 9 in which said organic amide is employed in an amount within the range of from about 100 grams to about 2,500 grams per gram-mole of polyhalo-substituted aromatic compound.

13. The method of claim 8 in which said polyhalo-substituted aromatic compound is p-dichlorobenzene, said organic amide is N-methyl-2-pyrrolidone, said base is sodium hydroxide and said thiocarbonate is potassium ethylxanthate.

14. The method of claim 8 in which water is removed from said first composition prior to maintaining said second composition at polymerization conditions.

* * * * *